Oct. 7, 1969     D. R. RICHER     3,470,618
EDGE FINDER
Filed July 21, 1967
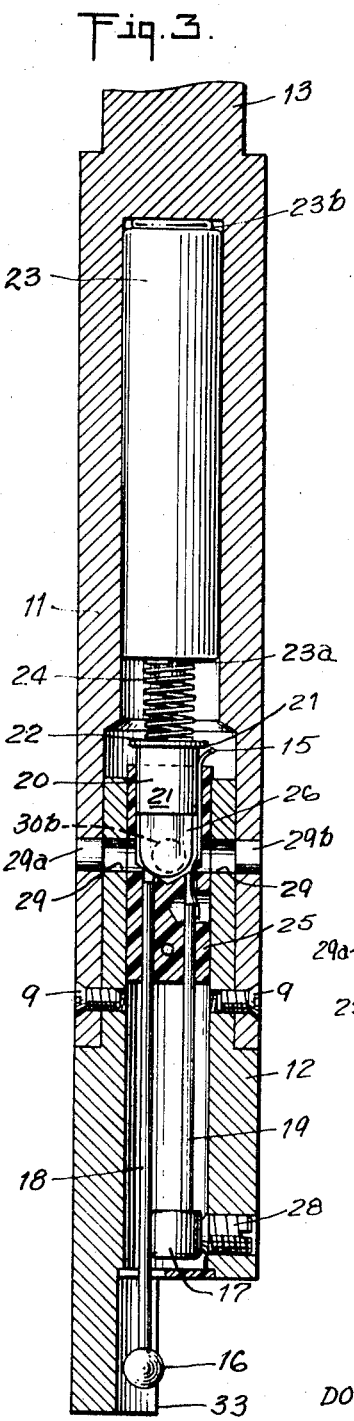
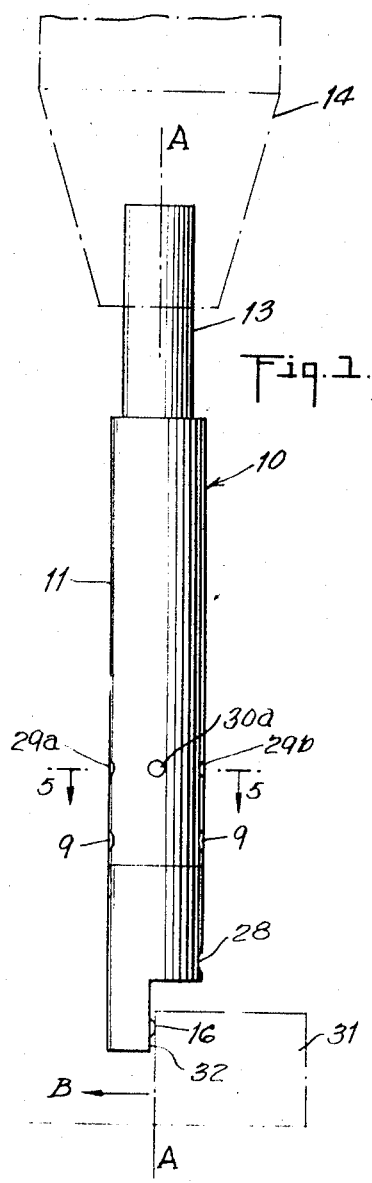
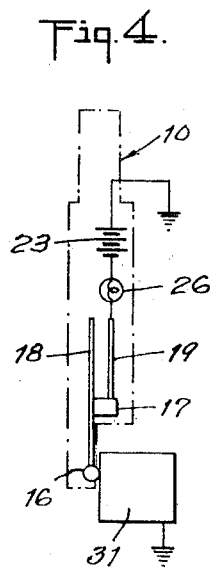
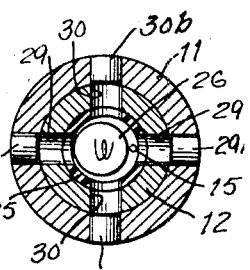
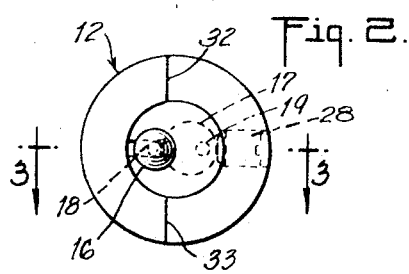
INVENTOR
DONALD R. RICHER United States Patent Office 3,470,618
Patented Oct. 7, 1969

3,470,618
EDGE FINDER
Donald R. Richer, Manchester, N.H., assignor to Granite State Machine Company, Inc., Manchester, N.H., a corporation of New Hampshire
Filed July 21, 1967, Ser. No. 655,154
Int. Cl. G1b 3/22, 5/00; G03b 1/64
U.S. Cl. 33—169                                2 Claims

ABSTRACT OF THE DISCLOSURE

This invention relates to an indicating device which is mounted in the spindle of a machine tool. An electrical contact depending from this device is prepositioned so as to be colinear with the centerline of this spindle, whereby when the edge of a metallic workpiece is brought into touching relation with this depending electrical contact, a circuit is completed which energizes a light bulb carried by the device thereby indicating that a datum point on the workpiece has been located which is colinear with the spindle centerline.

---

This invention relates to an improved gauging device, and more particularly relates to a device used to accurately locate the edge of a metal workpiece with respect to the centerline of a spindle of the type used on a drill or milling machine.

When performing precision machining operations, it is essential that the tool which does the drilling, or milling, or other cutting be accurately located with respect to a given datum. Oftentimes, the blueprint drawings which the machinist works from, locate the various dimensions from an accurately machined edge. Unless this machined edge can be positioned with respect to the centerline of the spindle, the location of the various holes, cutouts, or other machining operations is apt to be somewhat inaccurate.

This invention generally comprises a spindle-mounted housing member carrying a low-voltage electrical circuit operatively connected to a visual indicator light which is actuated by intimately contacting the datum edge on the metal workpiece to be machined with an accurately located switch component of the housing member. This indicator light is so constructed and arranged with the circuit that it will be extinguished when the datum edge of the workpiece is not correctly located, notwithstanding that there may be intimate contact between the switch component and the metal workpiece.

It is accordingly among the various objects of this invention to provide an edge-finder device which can be easily mounted in the tool-holding chuck of a conventional drill or milling machine spindle to be used for accurately locating the reference edge of a metal workpiece with respect to the centerline of the spindle.

It is another object of this invention to provide an edge finder which performs within accurately set limits with a go-no-go type of visual indicator light.

It is yet another object of this invention to provide a device of the class described whose limits of accuracy can be easily adjusted by the user to conform with whatever requirements are desired.

It is a still further object of this invention to provide a device of the class described which is sturdy, easy to manufacture, and virtually maintenance free.

With these and other objects in mind as will hereinafter more fully appear and which will be more particularly pointed out in the appended claims, reference is now had to the following description taken in conjunction with the accompanying drawings in which:

FIGURE 1 illustrates an elevation view of this edge-finder device mounted in a machine tool chuck and abutting against a metallic workpiece;

FIGURE 2 illustrates an enlarged bottom view of the device of FIGURE 1;

FIGURE 3 illustrates a cross-sectional elevation view of this device taken on line 3—3 of FIGURE 2;

FIGURE 4 depicts a schematic drawing of the electrical circuit of this invention; and FIGURE 5 illustrates an enlarged cross-sectional view of FIGURE 1 taken on line 5—5.

Referring now to the drawings, there is shown the edge-finder assembly 10 comprised of an upper housing 11 and lower housing 12 fastened together by screws 9 or other suitable fastening means. Housing 11 has its upper end formed into a shank portion 13 adapted for insertion into a conventional machine chuck 14, shown schematically in FIGURE 1.

Within this housing assembly 10 is carried an indicator subassembly electrically insulated from the housing and generally comprised of two electrical contacts, spheroid shaped contact 16, and cylindrically shaped contact 17 each carried at the end of its associated, electrically conductive arm member 18, 19, respectively, and electrically insulated from the housing assembly. The upper end of arm 19 is electrically connected by conductor 15 to the outer shell 20 of lamp-base 21. The center conductor 22 of lamp-base 21 is connected to the positive (+) terminal 23A of battery 23 by a compression spring 24. The negative (−) terminal 23b of battery 23 is in contact with the internal conductive wall portion of upper housing 11. Securely carried within the upper portion of housing member 12 is a core member 25 of electrically nonconductive material such as phenolic or the like. Core member 25 is recessed to receive light bulb 26, and apertured to receive and securely retain the end portions of arm members 18, 19.

The wall portion of lower housing 12 is apertured and threaded to communicate with the interior thereof and adapted to accommodate an adjustable set screw 28 of nylon or other suitable nonconductive material. This set screw 28 is radially located on the periphery of housing 12 so that advancement will bring it into abutting engagement with contact 17. By advancing set screw 28 against contact 17, which in turn bears against arm 18, the spherical face of contact 16 can be easily positioned for tangential relation with the shank centerline A—A, illustrated in FIGURE 1. The wall portion of housing assembly 10 is apertured diametrically at 29, 30 in substantial coplanar relation with light bulb 26. These apertures carry transparent insert members 29a, 29b, 30a, and 30b, respectively, for viewing bulb 26.

In operation, shank 13 is securely fastened in a chuck and/or spindle member 14 of a machine and the edge of a metal workpiece 31 is then carefully positioned against the spherical face of contact 16 which is already aligned with centerline A—A. Referring to the schematic wiring diagram of FIGURE 4, as the metal workpiece touches contact 16, the electrical circuit between the battery 23 and lamp 26 is completed and the lamp will glow as observed through the transparent apertures 29a, 29b, 30a, and 30b. This visual observation indicates that the edge of the workpiece contacted and the centerline of the spindle are now colinear. By establishing another point on the workpiece edge which is also colinear with the shank centerline A—A, an accurate right angular relationship can be established between such a workpiece edge and the machine spindle.

After establishing a colinear relation between workpiece 31 and spindle centerline A—A (as evidenced by the energizing of light bulb 26), should the workpiece be moved further in the direction of arrow B (FIGURE 1), arm 18 will be pushed away from contact 17, thereby breaking the electrical circuit and extinguishing light 26. This latter result indicates a noncolinear, i.e., out of alignment, condition between the datum edge of the workpiece and the spindle centerline A—A. In order to guard against bending arm 18 beyond its elastic limit, a portion of housing 12 partially shrouds contact 16 and provides stops 32, 33 which are located approximately .040 inch from the centerline A—A.

The relative adjustment of nylon screw 28 exerts a bearing force against arm 18, which accordingly provides for positioning contact 16 in a tangential relation with centerline A—A. Obviously, the care with which the screw 28 against arm 18 is made influences the accuracy of its performance.

Arm 18 is held in abutting relation against contact 17 by the force of its spring properties.

It will be understood that various changes in the details, materials, setups and arrangements of parts which have been herein illustrated in order to explain the nature of the invention, may be made by those skilled in the art.

I claim:

1. An edge finder for use in a chuck or spindle member, comprising, a housing assembly substantially concentric with a shank portion at one end thereof, an electrical indicator means carried interiorly of said housing assembly, a resiliently constrained contact member extending from said housing with its contact surface lying in substantial tangential relation to the centerline of said shank and electrically connected to the indicator means, wherein the electrical indicator means comprises, a light bulb, a battery connected to one of the terminals of said light bulb, means connecting the other terminal of said bulb to a first movable contact member, and means for biasing said first movable contact member against the resiliently constrained contact member to locate and maintain the contact surface in prescribed position.

2. The device set forth in claim 1 further comprising:
   (a) aperture means in the housing for viewing the light bulb; and
   (b) abutment means on said housing juxtaposed the resiliently constrained contact member and adapted to engage the surface of a workpiece, thereby limiting the extent of movement of the contact member.

References Cited

UNITED STATES PATENTS

| | | |
|---|---|---|
| 1,040,715 | 10/1912 | Mann. |
| 2,533,198 | 12/1950 | Radtke. |
| 2,645,024 | 7/1953 | Pool. |
| 2,649,783 | 8/1953 | Baugh. |
| 2,665,492 | 1/1954 | Freimark. |
| 2,860,418 | 11/1958 | Johnson. |
| 3,115,710 | 12/1963 | Blake. |
| 3,125,810 | 3/1964 | Hartmeister. |
| 3,370,356 | 2/1968 | Jend. |

FOREIGN PATENTS

| | | |
|---|---|---|
| 1,035,033 | 4/1953 | France. |

HARRY N. HAROIAN, Primary Examiner